(12) United States Patent
Fournier

(10) Patent No.: US 7,814,859 B2
(45) Date of Patent: Oct. 19, 2010

(54) POINTER WITH A CONTRASTING EDGE FOR A GAUGE OR SIMILAR, AND A METHOD OF FABRICATING SUCH A POINTER

(75) Inventor: Joël Fournier, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 77 days.

(21) Appl. No.: 11/794,619

(22) PCT Filed: Dec. 27, 2005

(86) PCT No.: PCT/FR2005/003282

§ 371 (c)(1),
(2), (4) Date: Jul. 3, 2007

(87) PCT Pub. No.: WO2006/072701

PCT Pub. Date: Jul. 13, 2006

(65) Prior Publication Data

US 2009/0266293 A1 Oct. 29, 2009

(30) Foreign Application Priority Data

Jan. 5, 2005 (FR) ................................. 0500068

(51) Int. Cl.
*G01D 13/22* (2006.01)
(52) U.S. Cl. .................. 116/328; 116/332; 116/DIG. 6
(58) Field of Classification Search .................. 116/284, 116/286–288, 303, 319, 321, 327, 328, 332, 116/62.1, DIG. 5, DIG. 6, DIG. 36
See application file for complete search history.

(56) References Cited

U.S. PATENT DOCUMENTS

| | | | |
|---|---|---|---|
| 2,278,520 A * | 4/1942 | Pfeffer et al. | 116/332 |
| 2,831,453 A * | 4/1958 | Hardesty | 116/288 |
| 4,848,264 A * | 7/1989 | Knietzsch et al. | 116/332 |
| 5,040,480 A | 8/1991 | Iwazaki et al. | |
| 6,470,822 B2 * | 10/2002 | Adams et al. | 116/284 |
| 6,511,194 B1 * | 1/2003 | Noll et al. | 362/23 |
| 6,981,464 B2 * | 1/2006 | Birman et al. | 116/288 |

FOREIGN PATENT DOCUMENTS

| | | |
|---|---|---|
| EP | 0 497 664 B2 | 8/2002 |
| FR | 2 689 233 | 10/1993 |
| JP | 2003075208 A * | 3/2003 |

* cited by examiner

*Primary Examiner*—Amy Cohen Johnson
(74) *Attorney, Agent, or Firm*—Foley & Lardner LLP

(57) ABSTRACT

According to an exemplary embodiment, a pointer includes an indicator portion including an arm of transparent material and a margin that projects laterally from the arm, the indicator portion also including a rear face that defines thereon a central zone corresponding to the arm and a peripheral zone corresponding to the margin. The rear face includes a first coating of a first color to cover the central zone only and a second coating of a second color to cover at least the peripheral zone.

13 Claims, 1 Drawing Sheet

POINTER WITH A CONTRASTING EDGE FOR A GAUGE OR SIMILAR, AND A METHOD OF FABRICATING SUCH A POINTER

CROSS-REFERENCE TO RELATED PATENT APPLICATIONS

The present application is a National Stage of International Application No. PCT/FR2005/003282 filed on Dec. 27, 2005, which claims the benefit of French Patent Application No. FR0500068, filed Jan. 5, 2005. The entire disclosures of International Application No. PCT/FR2005/003282 and French Patent Application No. FR0500068 are incorporated herein by reference.

BACKGROUND

The present application generally relates to a pointer with a contrasting edge for a gauge or similar device. The present application also relates to a method of fabricating such a pointer.

Pointers are known that include an indicator portion with a core of transparent material having a rear face carrying a first coating of a first color (e.g., white). This type of pointer is sometimes associated with a dial having a white background. To make the pointer visible against the white background, a shell of dark color may be applied to the core. The shell extends along the side walls of the core so as to form a contrasting edge, enabling the indicator portion of the pointer to be distinguished from the white background of the dial.

Adding a shell makes the pointer more complex and thus more expensive to fabricate.

SUMMARY

According to an exemplary embodiment, a pointer includes an indicator portion including an arm of transparent material and a margin that projects laterally from the arm, the indicator portion also including a rear face that defines thereon a central zone corresponding to the arm and a peripheral zone corresponding to the margin. The rear face includes a first coating of a first color to cover the central zone only and a second coating of a second color to cover at least the peripheral zone.

According to another exemplary embodiment, a method of fabricating a pointer with an indicator portion having a contrasting edge includes fabricating an indicator portion of transparent material with an arm and a margin projecting laterally from the arm, the indicator portion also including a rear face that defines a central zone corresponding to the arm and a peripheral zone corresponding to the margin. The method further includes depositing a first coating of a first color on the rear face so that the first coating covers the central zone. The method further includes depositing a second coating of a second color so as to cover at least the peripheral zone.

BRIEF DESCRIPTION OF THE DRAWINGS

The application will become more fully understood from the following description, taken in conjunction with the accompanying figures, in which.

DETAILED DESCRIPTION

Referring generally to the FIGURES, a pointer is shown according to an exemplary embodiment. The pointer includes an indicator portion with an arm made of transparent material. The indicator portion includes a rear face carrying a first coating of a first color. The indicator portion further includes a margin that projects laterally from the arm to provide an extended rear face. Such a configuration defines a central zone corresponding to the arm and a peripheral zone corresponding to the margin. The first coating covers the central zone only. A second coating of a second color covers at least the peripheral zone.

According to an exemplary embodiment, the portion of the second coating covering the peripheral zone remains visible via transparency of the margin and forms a contrasting edge of second color, enabling the pointer to be seen even over a dial of the first color.

The coatings of the invention are simple to apply and less expensive than a separate added cover, thereby reducing the cost of fabricating a pointer having a contrasting edge. The second coating preferably covers the entire rear face, thus improving the opaqueness of the first coating.

This application thus describes a pointer with a contrasting edge that is simple to fabricate. This application also describes a method of fabricating such a pointer.

Figure 1:
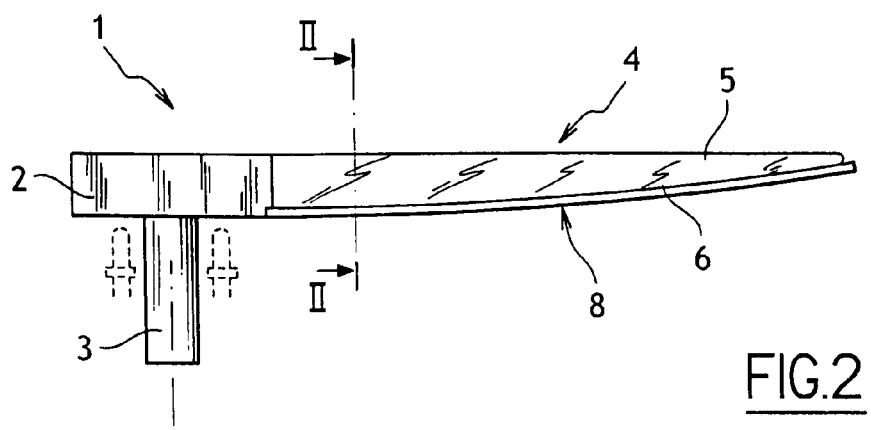
FIG. 1 is a side view of a body of a pointer during manufacture, according to an exemplary embodiment.

Referring to FIG. 1, a pointer is shown according to an exemplary embodiment. The pointer includes a body 1 of transparent plastic material. Body 1 may be formed by an injection-molding process or otherwise. Body 1 includes a hub 2. Hub 2 may have a circular or cylindrical shape. A stub axle 3 extends from the center of one of the faces of hub 2, and the stub axle is configured to be received in a central bearing of a gauge (not shown). An indicator portion 4 extends from a periphery of hub 2.

The face of the hub 2 carrying the axle 3 includes notches with oblique end walls (not shown) enabling light to be directed toward the indicator portion 4. The light may be produced by light-emitting diodes (LEDs) (drawn in dashed lines) placed under hub 2.

Figure 2:
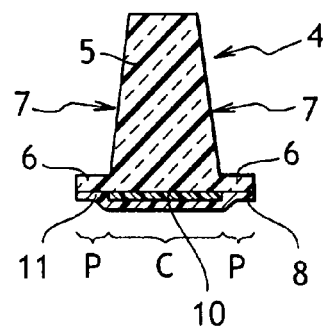
FIG. 2 is a section view on a larger scale on line II-II of FIG. 1, the thicknesses of the coatings being exaggerated.

As can be seen in FIG. 2, the indicator portion 4 includes an arm 5 surrounded by a margin 6 that projects from a side wall of the arm 5 around its entire periphery. The margin 6 extends close to the arm 5 in continuity therewith so as to define on the rear face 8 of the indicator portion 4 a central zone C that corresponds to the arm 5 and a peripheral zone P that corresponds to the margin 6.

Figure 3:
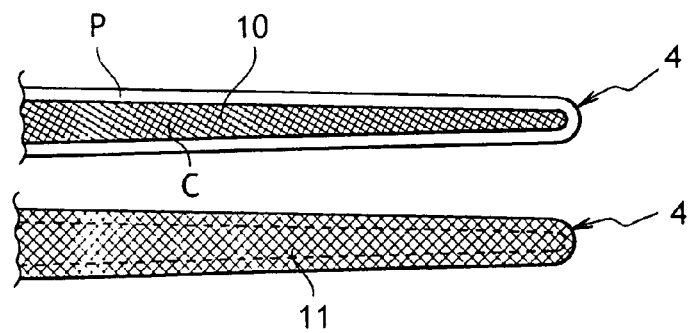
FIG. 3 is a view of the indicator portion of the pointer while the coatings are being applied.

The central zone C of the rear face 8 is covered by pad printing with a first coating 10, in this exemplary embodiment of white color (represented symbolically in FIG. 3 by fine cross-hatching).

Thereafter, pad printing is used to cover the entire rear face 8 with a second coating 11, in this exemplary embodiment of black color (represented symbolically in FIG. 3 by coarse cross-hatching). The second coating 11 thus covers first coating 10.

Figure 4:
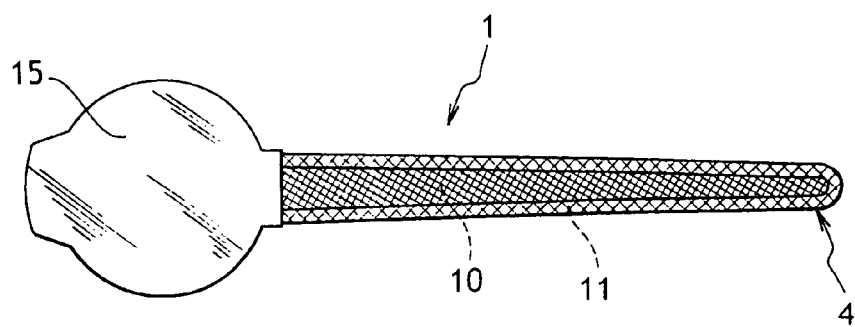
FIG. 4 is a plan view of the pointer of the invention, at the end of manufacture.

FIG. 4 shows a pointer at the end of manufacture, as seen by a user. The hub 2 is covered by a cap 15, while the indicator portion 4 shows, by transparency, the white central zone C and the black peripheral zone P.

The black peripheral zone P forms a contrasting edge clearly revealing the white central zone C of indicator portion 4 when the pointer is used on a dial of white color.

The invention is not limited to the above description, but on the contrary covers any variant falling within the scope of the claims.

In particular, although it is stated that the second coating covers the entire rear face of the indicator portion, the second coating could cover the peripheral zone only. Under such circumstances, both coatings could be deposited in a single operation.

Although it is stated that the coatings are pad-printed, they could be provided by any means (e.g., by painting with a brush or by silkscreen printing or by sticking a plastic film on the rear face).

Although it is stated that the entire body of the pointer is made of a transparent material, thus enabling light from an LED placed under the hub to be conveyed into the indicator portion, according to an alternative embodiment, only the indicator portion is made of transparent material so as to enable the central zone of the first color and the peripheral zone of the second color to be seen via the transparency of the indicator portion.

Although it is stated that the first coating is white in color and the second coating is black in color, the invention is naturally not limited to that particular selection of colors, and any combination of colors could be used.

The invention claimed is:

1. A pointer for a gauge, the pointer comprising:
   an indicator portion including an arm of transparent material and a margin that projects laterally from a side wall of the arm, the indicator portion also including a rear face configured to face the gauge, the rear face defining a central zone corresponding to the arm and a peripheral zone corresponding to the margin, the rear face including a first coating of a first color to cover the central zone only, and a second coating of a second color to cover at least the peripheral zone.

2. The pointer of claim 1, wherein the second coating extends over the first coating so as to cover the entire rear face.

3. The pointer of claim 1, wherein the peripheral zone forms a visibly contrasting edge relative to the central zone.

4. The pointer of claim 1, wherein the second coating covers only the peripheral zone.

5. A method of fabricating a pointer with an indicator portion having a contrasting edge, the method comprising:
   fabricating an indicator portion of transparent material with an arm and a margin projecting laterally from a side wall of the arm, the indicator portion also including a rear face configured to face the gauge, the rear face defining a central zone corresponding to the arm and a peripheral zone corresponding to the margin;
   depositing a first coating of a first color on the rear face so that the first coating covers the central zone; and
   depositing a second coating of a second color so as to cover at least the peripheral zone.

6. The method of claim 5, wherein the second coating is deposited so as to cover the entire rear face.

7. The method of claim 5, wherein the coatings are applied by pad-printing.

8. The method of claim 5, wherein depositing the first coating comprises sticking a plastic film on the rear face.

9. The method of claim 5, wherein depositing the first coating and depositing the second coating are conducted in a single operation.

10. An indicator of a pointer, the indicator comprising:
    a transparent arm;
    a transparent margin that projects laterally from a side wall of the arm;
    a rear face configured to face a gauge, the rear face comprising a central zone corresponding to the arm and a peripheral zone corresponding to the margin; and
    a colored coating on the peripheral zone to form a visually contrasting edge relative to at least one of a dial adjacent to the pointer and another structure of the indicator.

11. A pointer for a gauge, the pointer comprising:
    an indicator portion including an arm of transparent material and a margin that projects laterally from a side wall of the arm, the indicator portion also including a rear face facing the gauge in service, the rear face defining thereon a central zone corresponding to the arm and a peripheral zone corresponding to the margin, the rear face including a first coating of a first color on the central zone only and a second coating of a second color on at least the peripheral zone.

12. A pointer for a gauge, the pointer comprising:
    an indicator portion including an arm of transparent material and a margin that projects laterally from a side wall of the arm, the indicator portion also including a rear face facing the gauge in service, the rear face defining a central zone corresponding to the arm and a peripheral zone corresponding to the margin, the rear face including a colored coating on at least the peripheral zone to form a visually contrasting edge relative to at least one of a dial adjacent the pointer and another structure of the indicator.

13. A method of fabricating a pointer with an indicator portion having a contrasting edge, the method comprising:
    fabricating an indicator portion including an arm and a margin projecting laterally from a side wall of the arm, the indicator portion also including a rear face configured to face the gauge, the rear face defining a central zone corresponding to the arm and a peripheral zone corresponding to the margin; and
    depositing a colored coating on at least the peripheral zone to form a contrasting edge that contrasts with at least one of a dial adjacent the pointer and another structure of the indicator.

* * * * *

UNITED STATES PATENT AND TRADEMARK OFFICE
CERTIFICATE OF CORRECTION

| | | |
|---|---|---|
| PATENT NO. | : 7,814,859 B2 | Page 1 of 1 |
| APPLICATION NO. | : 11/794619 | |
| DATED | : October 19, 2010 | |
| INVENTOR(S) | : Joel Fournier | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this
Seventh Day of June, 2011

David J. Kappos
*Director of the United States Patent and Trademark Office*